(12) United States Patent
Matthews

(10) Patent No.: US 9,404,411 B2
(45) Date of Patent: *Aug. 2, 2016

(54) TURBOCHARGER SYSTEM HAVING AN AIR-COOLED SOLENOID VALVE

(71) Applicant: Ford Global Technologies, LLC, Dearborn, MI (US)

(72) Inventor: Patrick Matthews, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/943,676

(22) Filed: Jul. 16, 2013

(65) Prior Publication Data

US 2014/0047835 A1 Feb. 20, 2014

Related U.S. Application Data

(63) Continuation-in-part of application No. 13/588,593, filed on Aug. 17, 2012, now Pat. No. 9,188,057.

(51) Int. Cl.
| *F02B 33/44* | (2006.01) |
| *F02B 33/00* | (2006.01) |
| *F02B 37/16* | (2006.01) |
| *F02B 37/18* | (2006.01) |

(52) U.S. Cl.
CPC ............... *F02B 33/00* (2013.01); *F02B 37/164* (2013.01); *F02B 37/186* (2013.01); *Y02T 10/144* (2013.01)

(58) Field of Classification Search
CPC ..... Y02T 10/144; F02B 37/183; F02B 37/18; F02B 37/186; F02C 6/12; F16K 49/00

USPC .......... 60/602, 599, 320, 605.2; 137/500, 100
See application file for complete search history.

(56) References Cited

U.S. PATENT DOCUMENTS

| 3,195,805 | A | * | 7/1965 | Cholvin et al. ............... 137/500 |
| 4,463,564 | A | | 8/1984 | McInerney |
| 4,630,445 | A | | 12/1986 | Parker |
| 5,036,668 | A | | 8/1991 | Hardy |
| 5,505,226 | A | | 4/1996 | Breth |
| 6,739,845 | B2 | | 5/2004 | Woollenweber |
| 8,499,555 | B2 | * | 8/2013 | Wolk et al. ...................... 60/602 |
| 2007/0245725 | A1 | | 10/2007 | Brown et al. |

FOREIGN PATENT DOCUMENTS

GB 2353328 A 2/2001

* cited by examiner

*Primary Examiner* — Thomas Denion
*Assistant Examiner* — Thomas Olszewski
(74) *Attorney, Agent, or Firm* — Julia Voutyras; Alleman Hall McCoy Russell & Tuttle LLP

(57) ABSTRACT

A turbocharger system is provided. The turbocharger system includes a turbine positioned downstream of a combustion chamber and a turbine bypass conduit in fluidic communication with a turbine inlet and a turbine outlet. The turbocharger system further includes a wastegate positioned in the turbine bypass conduit, a wastegate actuator coupled to the wastegate adjusting a position of the wastegate, and an air-cooled solenoid valve coupled to wastegate actuator adjusting a position of the wastegate actuator, the air-cooled solenoid valve receiving cooling airflow from an intake conduit positioned upstream of a compressor mechanically coupled to the turbine.

20 Claims, 5 Drawing Sheets

TURBOCHARGER SYSTEM HAVING AN AIR-COOLED SOLENOID VALVE

CROSS REFERENCE TO RELATED APPLICATIONS

The present application is a continuation-in-part of U.S. patent application Ser. No. 13/588,593, filed on Aug. 17, 2012, the entire contents of which are hereby incorporated by reference for all purposes.

FIELD

The present disclosure relates to an air-cooled solenoid valve in a turbocharger system in a vehicle.

BACKGROUND/SUMMARY

Boosting device, such as turbochargers and superchargers, may be used in engines. Turbochargers may increase the power output of the engine for a given displacement as compared to a naturally aspirated engine.

It may be desirable to decrease the flow path between the turbine in the turbocharger and the combustion chambers by positioning the turbine close to the exhaust ports of the cylinders. Such positioning decreases losses in the exhaust gas flow, thereby enabling the speed of the turbine to increase. The increased turbine speed increases the amount of compression provided by the compressor. As a result, the power output of the engine may be increased.

However, due to the proximity of the turbine to the combustion chamber, the turbine and surrounding components may experience elevated temperatures. In some engines the exhaust manifold and turbine housing may have radiating surface temperatures over 900 degrees Celsius. Consequently, the turbine and surrounding components may experience thermal degradation, decreasing component longevity. For example, wastegates may become inoperable during such over-temperature conditions. Wastegate actuators may be particularly susceptible to elevated temperatures due to the characteristics of the valve control component included therein, such as circuits, solenoids, etc.

U.S. Pat. No. 4,630,445 discloses a turbocharger with a wastegate valve for adjusting the amount of exhaust gas provided to a turbine in the turbocharger. A heat shield is used in the wastegate to protect the valve stem in the wastegate from elevated temperature conditions. The Inventors have recognized several drawbacks with the wastegate valve disclosed in U.S. Pat. No. 4,630,445. For example, the heat shield may reduce the amount of heat transferred to the wastegate but does not actively cool the wastegate. Furthermore, heat may be transferred to the wastegate components from paths which are not impeded by the heat shield. Consequently, the wastegate valve disclosed in U.S. Pat. No. 4,630,445 may still experience over-temperature conditions during engine operation.

Likewise, attempts have been made to cool the wastegate actuator via engine coolant diverted from the engine cooling system. However, utilizing engine coolant to cool the wastegate actuator may require high integrity plumbing and increases the likelihood of coolant leaks through new leak paths. The high integrity plumbing may also be costly.

As such in one approach a turbocharger system is provided. The turbocharger system includes a turbine positioned downstream of a combustion chamber and a turbine bypass conduit in fluidic communication with a turbine inlet and a turbine outlet. The turbocharger system further includes a wastegate positioned in the turbine bypass conduit, a wastegate actuator coupled to the wastegate adjusting a position of the wastegate, and an air-cooled solenoid valve coupled to wastegate actuator adjusting a position of the wastegate actuator, the air-cooled solenoid valve receiving cooling airflow from an intake conduit positioned upstream of a compressor mechanically coupled to the turbine.

In this way, cooling is provided to the solenoid valve via intake air, thereby reducing the thermal stress on the solenoid valve. Consequently, the longevity of the solenoid valve may be increased when air cooling is provided. Furthermore, when intake air is used to cool the solenoid valve, cooling of the solenoid valve via engine coolant may be avoided or reduced, if desired. As a result, the cost and complexity of the engine is reduced and the likelihood of coolant leaks and potential cooling system degradation is reduced.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

A turbocharger system having an air-cooled wastegate actuator and/or air-cooled solenoid valve is described herein. The wastegate actuator converts electrical control signals received from a control system into mechanical actuation. The mechanical actuation is translated from the wastegate actuator to the wastegate valve in the turbine bypass conduit. Intake air may be routed to the wastegate actuator to cool the actuator, and then be routed back to the intake system. In one example, un-compressed intake air may be routed to the wastegate actuator to cool the actuator and then returned back to the compressor inlet. In this way, exhaust heat transferred to the wastegate actuator may be dissipated in the cooling air. Further, when using a charge-air cooling downstream of the compressor, the warmed intake air can then be cooled before being ingested in the engine.

Thus, in one embodiment, the air-cooled wastegate actuator receives intake air from the intake system to reduce the temperature of the wastegate actuator, thereby reducing the likelihood of wastegate degradation from elevated temperatures. In one example, the wastegate actuator may be positioned adjacent the wastegate and turbine, near the engine exhaust. In other examples, the air-cooled wastegate actuator may be positioned in the engine's intake system. In this way, the intake system may serve a dual use, providing intake air to the engine, as well as cooling the wastegate actuator. Therefore, routing engine coolant to the wastegate actuator, may be avoided or reduced, if desired. Consequently, the complexity and cost of the engine may be reduced while increasing the longevity of the wastegate actuator.

Further in one example, the wastegate actuator is controlled via an air cooler solenoid valve. The air-cooled solenoid valve may receive cooling air from an intake conduit upstream of a compressor. For instance, the air-cooled solenoid valve may include a heat sink tab extending from the solenoid valve to an intake conduit. The heat sink tab may be in face sharing contact with an exterior surface of the intake conduit. In this way, the solenoid valve may be cooled via intake air flowing through the intake system. As a result, the likelihood of an over-temperature condition in the valve is reduced, thereby increasing the valve's longevity and improving solenoid valve operation.

Figure 1:
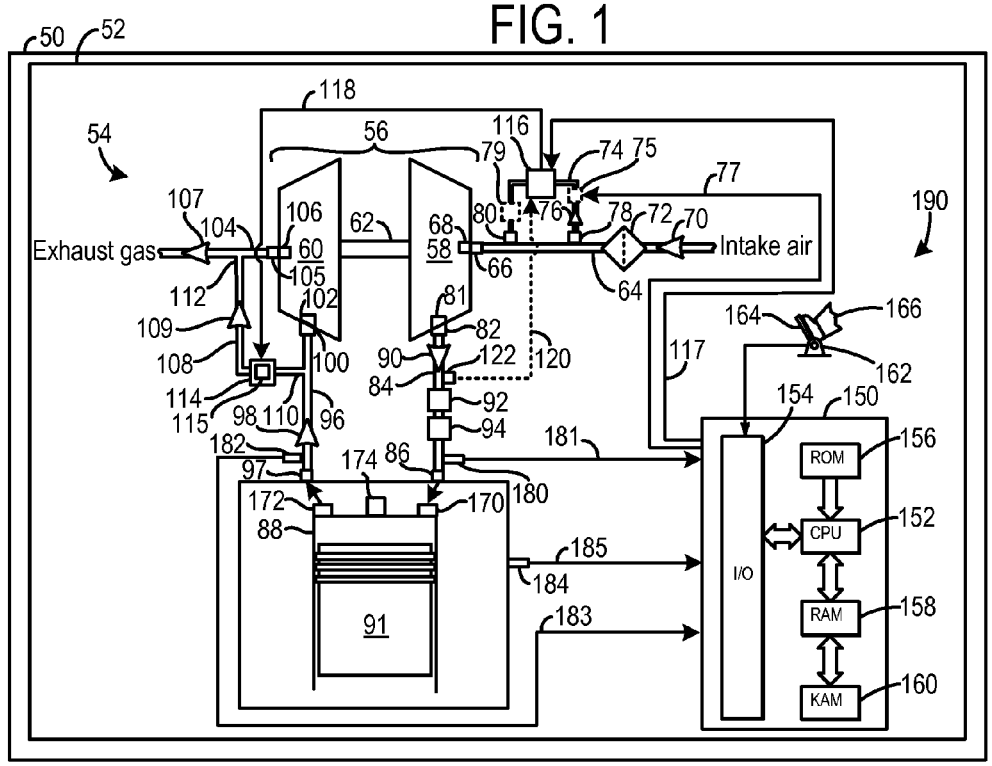
FIG. 1 shows a vehicle having an engine including a turbocharger system.
Figure 2:
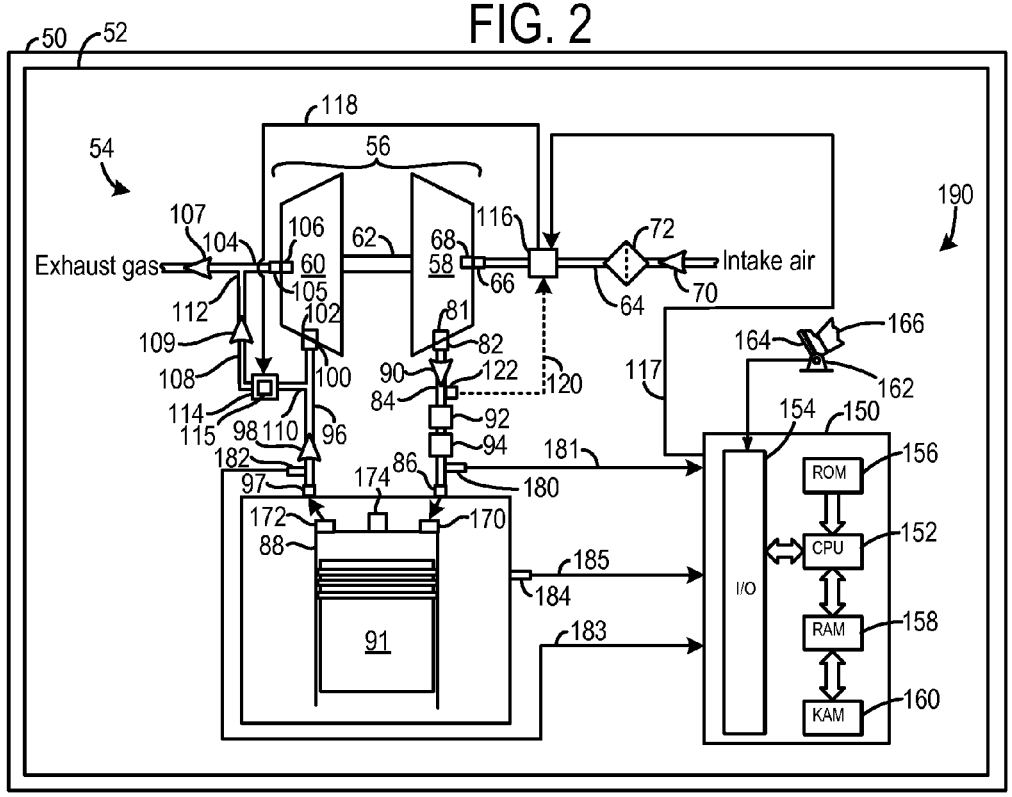
FIG. 2 shows a vehicle having an engine including a turbocharger system.
Figure 3:
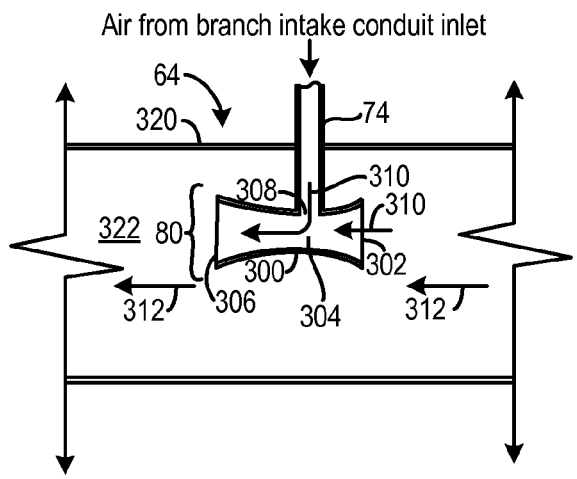
FIG. 3 shows a detailed view of the branch intake conduit inlet included in the turbocharger system shown in FIG. 1.
Figure 4:
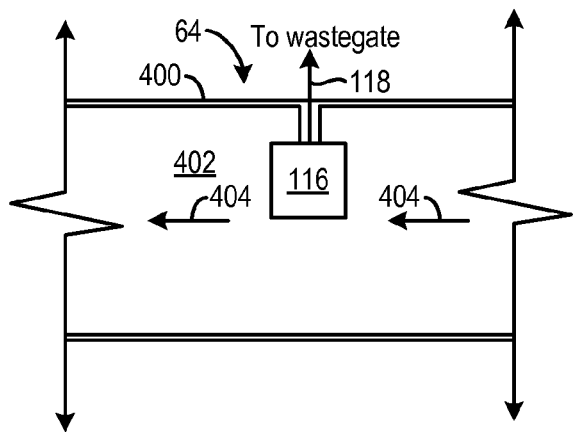
FIG. 4 shows a detailed view of the wastegate actuator included in the turbocharger system shown in FIG. 2.
Figure 5:
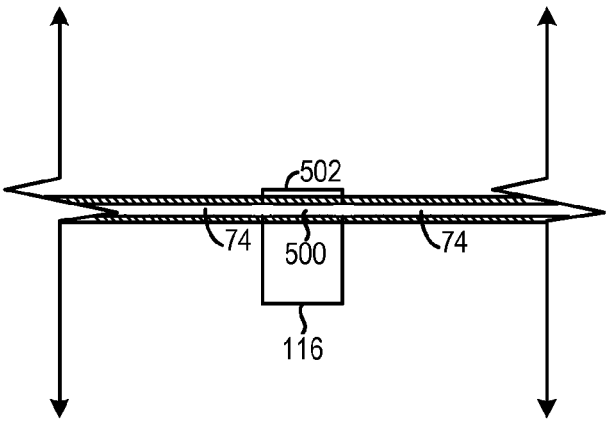
FIG. 5 shows a detailed view of the wastegate actuator included in the turbocharger system shown in FIG. 1.
Figure 6:
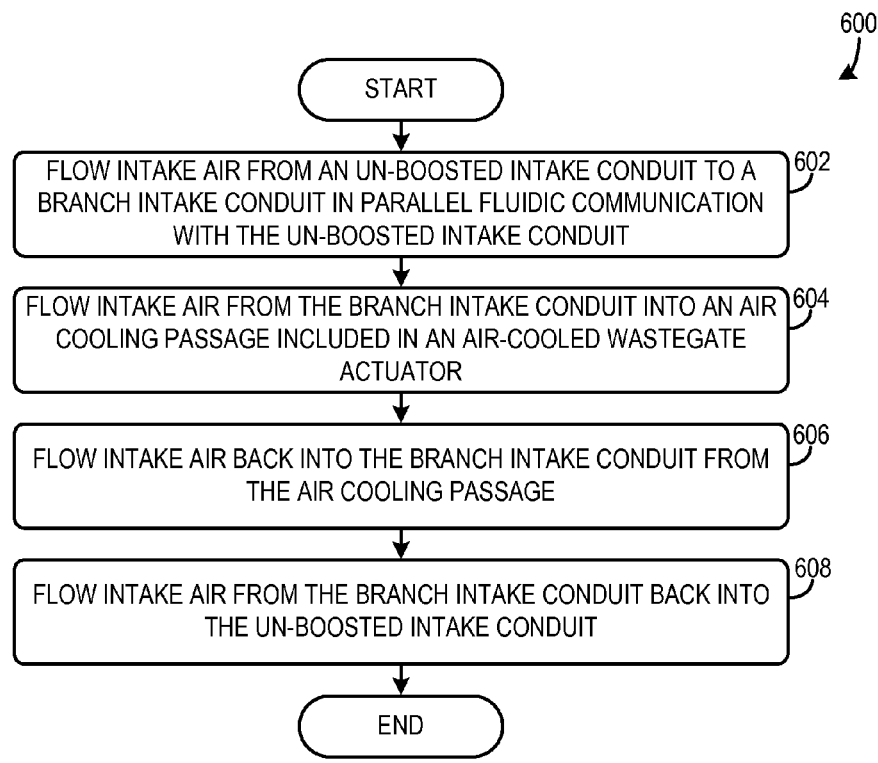
FIG. 6 shows a method for operation of a turbocharger system, such as the turbocharger system of FIG. 1 or 2.

FIGS. 1 and 2 show first and second examples of a turbocharger system included in an engine of a vehicle. FIG. 3-5 show detailed configurations of the turbocharger systems shown in FIGS. 1 and 2. FIG. 6 shows a method for operation of a turbocharger system.

FIG. 1 shows a schematic depiction of a vehicle 50 including an internal combustion engine 52 having a turbocharger system 54. The turbocharger system 54 may include a turbocharger 56 having a compressor 58 mechanically coupled to a turbine 60. A shaft 62 is shown coupling the compressor 58 to the turbine 60. In this way, the compressor 58 is rotationally coupled to the turbine 60. However, it will be appreciated that the compressor may be coupled to the turbine via alternate or additional linkage (e.g., mechanical linkage). The compressor 58 is positioned upstream of a combustion chamber 88 and the turbine 60 is positioned downstream of the combustion chamber.

The compressor 58 is configured to receive intake air from an intake conduit 64. Therefore, the intake conduit 64 is positioned upstream of the compressor 58. The intake conduit 64 is an un-boosted intake conduit, in the depicted example. Thus, the intake conduit 64 includes an outlet 66 in fluidic communication (e.g., direct fluidic communication) with a compressor inlet 68 included in the compressor 58. The compressor inlet 68 is generically depicted via a box. The intake conduit 64 is configured to receive ambient air. Arrow 70 denotes the general flow of intake air through the intake conduit 64. An air filter 72 is coupled to (e.g., positioned within) the intake conduit 64. The air filter 72 is configured to remove unwanted particulates from the air flowing through the intake conduit.

Another intake conduit 74 is coupled to the intake conduit 64. The intake conduit 74 is a branch intake conduit in the depicted example. Thus, the intake conduit 74 is in parallel fluidic communication with the intake conduit 64. The general flow of intake air through the intake conduit 74 is denoted via arrow 76. The intake conduit 74 includes an inlet 78 and an outlet 80. The inlet 78 and outlet 80 open into upstream and downstream locations respectively in the intake conduit 64. However, in other examples, the inlet 78 may not be coupled to the intake conduit 64, but instead may receive ambient air from the surrounding environment. However, when the inlet 78 is coupled to the intake conduit 74 the conduit receives filtered intake air, reducing the likelihood of fouling of an air-cooler wastegate actuator 116, which may be coupled to the intake conduit 74, discussed in greater detail herein. Additionally, coupling the inlet 78 to the intake conduit 74 as opposed to receiving ambient air at the inlet 78 impedes unfiltered air from being introduced into the combustion chamber 88, which may degrade combustion operation. Therefore, if the inlet 78 is configured to receive ambient air an air filter may be coupled to (e.g., positioned within) the inlet 78 in one example. The intake conduit 74 may have a smaller cross-sectional area than the intake conduit 64 in some examples. However, other relative sizes have been contemplated. A fan 79 may be coupled to the branch intake conduit 74, in some examples. The fan 79 may be used to increase the airflow through the intake conduit 74. However, in other examples, just the pressure differential between the inlet and the outlet of the intake conduit 74 may be used to flow air therethrough. A valve 75 may be coupled to the intake conduit 74. The valve 75 may be configured to adjust the amount of airflow travelling through the intake conduit 74. The valve 75 may receive control signals from a controller 150 indicated via signal line 77. As shown, the valve is positioned upstream of a wastegate actuator 116. However, other valve positions have been contemplated such as downstream of the wastegate actuator 116. In other examples, the valve 75 may not be coupled to the intake conduit 74.

The compressor 58 includes a compressor outlet 81 in fluidic communication with an inlet 82 of an intake conduit 84. Arrow 90 denotes the general airflow direction through the conduit 84. The compressor 58 is configured to increase the pressure of the intake air travelling therethrough. In this way, boost may be provided to engine 52. Therefore, the intake conduit 84 is a boosted intake conduit in the depicted example. However, other intake system configurations have been contemplated. The intake conduit 84 also includes an outlet 86 in fluidic communication with a combustion chamber 88 in the engine 52. In some examples, the intake conduit 84 may be in fluidic communication with an intake manifold (not shown). The intake manifold may be configured to supply intake air to the combustion chamber 88. An intake valve 170 and an exhaust valve 172 are coupled to the combustion chamber 88. It will be appreciated that the engine 52 may include at least one intake valve and exhaust valve per combustion chamber. The intake and exhaust valves configured to cyclically open to facilitate combustion operation in the combustion chamber. A piston 91 is positioned in the combustion chamber 88.

During operation, the combustion chamber 88 in the engine 52 typically undergoes a four stroke cycle: the cycle includes the intake stroke, compression stroke, expansion stroke, and exhaust stroke. In a multi-cylinder engine the four stroke cycle may be carried out in additional combustion chambers. During the intake stroke, generally, exhaust valve 172 closes and intake valve 170 opens. Air is introduced into combustion chamber 88 via an intake manifold, for example, and piston 91 moves to the bottom of the combustion chamber so as to increase the volume within combustion chamber 88. The position at which piston 91 is near the bottom of the combustion chamber and at the end of its stroke (e.g. when combustion chamber 88 is at its largest volume) is typically referred to by those of skill in the art as bottom dead center (BDC). During the compression stroke, intake valve 170 and exhaust valve 172 are closed. Piston 91 moves toward the cylinder head so as to compress the air within combustion chamber 88. The point at which piston 91 is at the end of its stroke and closest to the cylinder head (e.g. when combustion chamber 88 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as a spark plug 174, resulting in combustion. Additionally or alternatively compression may be used to ignite the air/fuel mixture. During the expansion stroke, the expanding gases push piston 91 back to BDC. A crankshaft may convert piston movement into a rotational torque of the rotary shaft. Finally, during the exhaust stroke, exhaust valve 172 opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples. Additionally or alternatively compression ignition may be implemented in the combustion chamber 88.

A charge air cooler 92 and a throttle 94 are coupled to the intake conduit 84 in the depicted example. However, in other examples, the charge air cooler and/or throttle may not be coupled to the intake conduit 84. Further in the depicted example, the throttle 94 is positioned downstream of the charge air cooler 92. However, in other examples the throttle may be positioned upstream of the charge air cooler.

An exhaust conduit 96 may also be in fluidic communication with the combustion chamber 88. Thus, the exhaust conduit 96 may receive exhaust gas from the combustion chamber 88 during engine operation and includes an inlet 97. Arrow 98 depicts the general exhaust gas flow through the exhaust conduit 96.

The exhaust conduit 96 includes an outlet 100 in fluidic communication with a turbine inlet 102 of the turbine 60. The turbine 60 may include turbine blades configured to receive exhaust gas from the turbine inlet 102, in some examples.

An exhaust conduit 104 is in fluidic communication with a turbine outlet 106. Specifically, the exhaust conduit 104 includes an inlet 105 in fluidic communication with turbine outlet 106. The exhaust conduit 104 is configured to flow exhaust gas to the surrounding environment. Arrow 107 denotes the general flow of exhaust gas through the exhaust conduit 104.

A turbine bypass conduit 108 is included in the turbocharger system 54. The turbine bypass conduit 108 includes a bypass conduit inlet 110 positioned upstream of the turbine 60 and opening into the exhaust conduit 96 and a bypass conduit outlet 112 positioned downstream of the turbine 60 and opening into the exhaust conduit 104. Therefore, the turbine bypass conduit 108 is in fluidic communication with the turbine inlet 102 and the turbine outlet 106. Specifically, in some examples, the turbine bypass conduit may be directly coupled to the turbine inlet 102 and the turbine outlet 106. However, other turbine bypass conduit configurations have been contemplated. Arrow 109 depicts the general direction of exhaust gas flow through the turbine bypass conduit 108 when a wastegate 114 is open. It will be appreciated that the relative sizes (e.g., cross-sectional areas) of the turbine bypass conduit 108 and the exhaust conduits 96 and 104 may be selected based on the desired performance characteristics of the turbocharger.

The wastegate 114 is coupled to the turbine bypass conduit 108. Specifically in some examples, the wastegate 114 may be positioned in the turbine bypass conduit 108. The wastegate 114 is configured to adjust the exhaust gas flow through the turbine bypass conduit 108. In this way, the speed of the turbine may be regulated. In some examples, the wastegate may have an open configuration in which exhaust gas can flow through the turbine bypass conduit 108 and a closed configuration in which exhaust gas is substantially inhibited from flowing through the turbine bypass conduit. It will be appreciated that in some examples the wastegate 114 may a number of open configurations, each configuration allowing a different amount of exhaust gas to flow through the turbine bypass conduit. Further, in some examples, the wastegate 114 may be discretely or continuously adjustable in configurations which have varying degrees of opening. In this way, the wastegate 114 may precisely adjust the speed of the turbine 60. In some examples, the wastegate 114 may include a valve 115 that adjusts an opening in the bypass conduit.

An air-cooled wastegate actuator 116 is coupled to the wastegate 114 in the depicted example. The air-cooled wastegate actuator 116 and the wastegate 114 may be included in the turbocharger system 54. In one example, wastegate actuator 116 includes an electrically controlled solenoid, or an electronically controlled pneumatic actuator. Line 118 denotes the coupling of the air-cooled wastegate actuator 116 to the wastegate 114, including the valve forming the wastegate. The coupling forming line 118 may include a mechanical linkage in one example, coupling the waste-gate actuator's controlled movement with movement of a valve of the wastegate. In this way, the air-cooled wastegate actuator 116 is configured to adjust the wastegate 114. Specifically, the air-cooled wastegate actuator 116 may be configured to adjust the amount of exhaust gas passing through the turbine bypass conduit 108. In this way, the speed of the turbine 60 may be adjusted.

As explained herein, the air-cooled wastegate actuator 116 may receive cooling airflow from the branch intake conduit 74 and therefore also receive cooling airflow from the intake conduit 64 in the depicted example. However, in the example depicted in FIG. 2, the air-cooled wastegate actuator 116 directly receives cooling airflow from the intake conduit 64. In this way, the air-cooled wastegate actuator 116 may be cooled via intake airflow, thereby reducing the temperature of the wastegate actuator. Further, it may be positioned further from the exhaust, also reducing exhaust heat transferred from the exhaust.

In some examples, the air-cooled wastegate actuator 116 may be a pneumatic wastegate actuator. In such an example, the air-cooled wastegate actuator may include a diaphragm coupled to a spring. A pneumatic conduit may provide a boosted air pressure to the diaphragm. Line 120 denotes the pneumatic conduit. The pneumatic conduit 120 includes a pneumatic conduit inlet 122 opening into the intake conduit and a pneumatic conduit outlet 124 opening into the diaphragm in the wastegate actuator. The wastegate actuator may adjust the wastegate based on the pressure exerted on the diaphragm. For example, the wastegate actuator may increase the amount of airflow through the wastegate as the pressure against the diaphragm increases and/or the wastegate may open when the pressure against the diaphragm exceeds a predetermined threshold value. However, other control methods have been contemplated. It will be appreciated that the pressure on the diaphragm is proportional to the boost air pressure downstream of the compressor 58. The spring and diaphragm may be coupled to the wastegate 114 via linkage (e.g., mechanical linkage). In this way, the pneumatic wastegate actuator 116 receives boosted air from an intake conduit positioned downstream of the compressor. When the air-cooled wastegate actuator 116 is a pneumatic wastegate actuator, line 118 denotes pneumatic linkage between the wastegate actuator and the wastegate. However, in other examples, the pneumatic conduit may not be included in the turbocharger system 54. Further in some examples, the wastegate actuator 116 may be coupled to the wastegate mechanically (e.g., via mechanical linkage).

In some examples, the air-cooled wastegate actuator 116 may include a solenoid and/or a motor for adjusting the wastegate. Therefore, the air-cooled wastegate actuator 116 may have electronic driven circuitry. The solenoid and/or motor may be controlled by a controller 150. More generally, the air-cooled wastegate actuator 116 may be controlled by the controller 150 and therefore receive control signals from a controller, denoted via line 117. The controller 150 is shown in FIG. 1 as a conventional microcomputer including: microprocessor unit 152, input/output ports 154, read-only memory 156, random access memory 158, keep alive memory 160, and a conventional data bus. Controller 12 may receive various signals from sensors coupled to engine 10. For example, controller 12 may receive signals from a position sensor 162 coupled to an accelerator pedal 164 for sensing accelerator position adjusted by foot 166.

The controller 150 may receive signals from sensors in the vehicle 50 such as a pressure sensor 180 electronically coupled to the controller via a signal line 181, a pressure sensor 182 electronically coupled to the controller via a signal line 183, a temperature sensor 184 electronically coupled to the controller via a signal line 185. As shown, the pressure sensor 180 is coupled to the intake conduit 84, the pressure sensor 182 is coupled to the exhaust conduit 96, and the temperature sensor 184 is coupled to the engine 52. However, other sensor positions have been contemplated. For example, a temperature sensor and/or pressure sensor may be coupled to the branch intake conduit 74, the wastegate actuator 116, the wastegate 114, and/or the turbine bypass conduit 108. As previously discussed the controller 150 may also send a control signal to the wastegate actuator 116 via signal line 117. The controller 150 may be included in a control system 190. The aforementioned sensors may also be included in the control system, in some examples. The intake conduits (64, 74, and 84) may be referred to as a first intake conduit a second intake conduit, a third intake conduit etc., depending on their introductory order in some examples. Likewise the exhaust conduits 96 and 104 may be referred to as a first exhaust conduit, a second exhaust conduit, etc., depending on their introductory order.

FIG. 2 shows a second embodiment of the turbocharger system 54. FIG. 2 includes some of the components in the turbocharger system 54 shown in FIG. 1, therefore similar parts are labeled accordingly. To avoid redundancy the similar components are not discussed with regard to FIG. 2. However, it will be appreciated that the components may be substantially identical.

The intake conduit 64 is shown in FIG. 2. However, the branch intake conduit is omitted from FIG. 2. The air-cooled wastegate actuator 116 is coupled to the intake conduit 64 in the embodiment shown in FIG. 2. Specifically, the air-cooled wastegate actuator 116 may be positioned within the intake conduit 64. In this way, air flowing through the intake conduit 64 may be flowed around the wastegate actuator to remove heat from the actuator. As a result, the likelihood of wastegate actuator thermal degradation is reduced, thereby increasing the longevity of the wastegate actuator. No additional cooling systems may be coupled to the air-cooled wastegate actuator, if desired. However, in some examples additional cooling systems may be used to cool the wastegate actuator.

FIG. 3 shows a detailed view of the branch intake conduit outlet 80, shown in FIG. 1. A portion of the intake conduit 64 is also depicted in FIG. 3. The intake conduit 64 includes a housing 320 defining a boundary of an interior flow passage 322. As shown, an aspirator 300 (e.g., venturi pump) may be included in the branch intake conduit outlet 80. The aspirator 300 includes an inlet 302, a throat 304, an outlet 306, and a vacuum port 308. The vacuum port 308 is in fluidic communication with upstream sections of the branch intake conduit 74. Arrows 310 depict the general flow direction of air through the aspirator 300 and the branch intake conduit 74. Arrows 312 depict the general flow direction of air through the intake conduit. It will be appreciated that the aspirator 300 increases the airflow through the branch intake conduit 74. As a result, a greater amount of intake air may be flowed to the air-cooled wastegate actuator 116 shown in FIG. 1, increasing the amount of heat removed from the actuator. Consequently, the likelihood of wastegate actuator thermal degradation is further reduced.

FIG. 4 shows a detailed view of the air-cooled wastegate actuator 116 shown in FIG. 2. The intake conduit 64 includes a housing 400 defining a boundary of an interior flow passage 402. As shown, the air-cooled wastegate actuator 116 is positioned within an interior of the intake conduit 64. Specifically, the air-cooled wastegate actuator 116 is coupled to the interior of the housing 400 in the depicted example. Thus, the housing 400 at least partially surrounds the air-cooled wastegate actuator 116. Arrows 404 denote the general direction of airflow through the intake conduit 64. However, it will be appreciated that the airflow pattern has greater complexity that is not depicted. As shown, intake air is directed around the wastegate actuator 116, thereby cooling the wastegate actuator 116. Therefore, the wastegate actuator 116 receives airflow within the intake conduit 64. In this way, the likelihood of thermal degradation of the wastegate actuator is reduced.

FIG. 5 shows another example air-cooled wastegate actuator 116. The wastegate actuator 116 shown in FIG. 5 may be included in the turbocharger system embodiment shown in FIG. 1. The air cooler wastegate actuator 116 includes an air cooling passage 500. As shown, the air cooling passage 500 is in series fluidic communication with the branch intake conduit 74. In the depicted example, the air cooling passage 500 extends into the air-cooled wastegate actuator 116. Thus, the air cooling passage 500 traverses the air-cooled wastegate actuator 116. Specifically, the air cooling passage spans a length of the air-cooled wastegate actuator 116. In some examples, the air cooling passage may include a first section flowing air in a first direction and a second section flowing air in an opposite direction. However, other air cooling passage configurations have been contemplated. For example, the air cooling passage may be coupled to a housing 502 of the air-cooled wastegate actuator 116 and traverse the housing.

FIG. 6 shows a method 600 for operation of a turbocharger system. The method 600 may be implemented via the systems (e.g., control system and turbocharger system) and components described above with regard to FIGS. 1-5 or may be implemented via other suitable systems and components.

At 602 the method includes flowing intake air from an un-boosted intake conduit (e.g., intake conduit 64, shown in FIG. 1) to a branch intake conduit (e.g., branch intake conduit 74, shown in FIG. 1) in parallel fluidic communication with the un-boosted intake conduit. Next at 604 the method includes flowing intake air from the branch intake conduit into an air cooling passage (e.g., air cooling passage 500, shown in FIG. 5) included in an air-cooled wastegate actuator (e.g., air-cooled wastegate actuator 116, shown in FIG. 5).

At 606 the method includes flowing intake air back into the branch intake conduit from the air cooling passage. Next at 608 the method includes flowing intake air from the branch intake conduit back into the un-boosted intake conduit. In some examples, the intake air may be flowed from the branch intake conduit back into the un-boosted intake conduit at a location downstream from where the intake air is flowed from the un-boosted intake conduit to the branch intake conduit. Further in some examples, the amount of air flowing through the branch intake conduit may be adjusted via a valve positioned in the branch intake conduit based on the temperature of the engine, for instance.

Note that in additional embodiments, a method for operating the engine may include directing boosted intake air over a body of a wastegate actuator to cool the wastegate actuator. The boosted air may be directed to the wastegate actuator via a branch conduit leading from downstream of the compressor to upstream of the compressor, for example in a compressor bypass line. The branch conduit may also be positioned from upstream of the compressor to another position upstream of the compressor. The wastegate actuator may be controlled by a control system and receive electrical actuation signals from the control system. The wastegate actuator may be mechanically coupled to the turbocharger wastegate to control operation of the wastegate during engine operation.

In some example, the amount of air directed to the wastegate actuator in the branch intake conduit may be adjusted by a valve positioned in the branch intake conduit. The valve may be adjusted by the controller based on operating conditions. For example, exhaust temperature may be estimated by the controller and the valve in the branch intake conduit may be increased as the exhaust temperature increases, thereby providing sufficient cooling to the wastegate actuator. Further, engine operation may be adjusted based on the amount of airflow directed through the branch intake conduit, and based on its temperature. For example, increased coolant may be provided to the charge air cooler in proportion to the amount and/or temperature of the airflow directed through the branch intake conduit. As another example, compressor bypass valve operation may be adjusted to compensate for the increased airflow through the branch intake conduit, in reverse proportion to one another.

Figure 7:
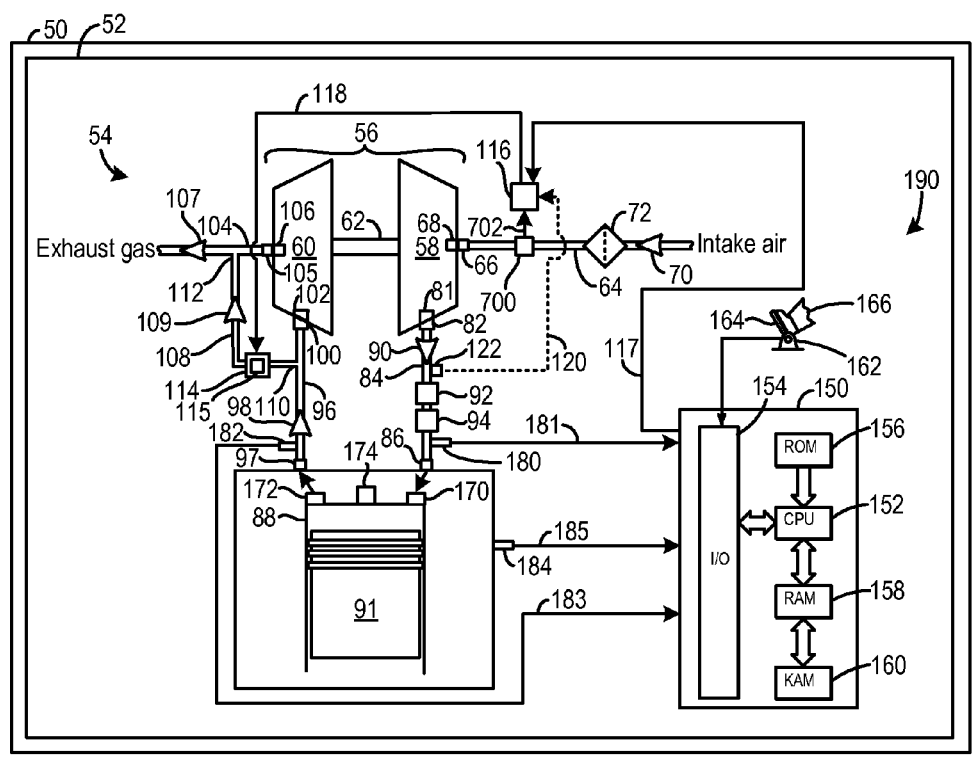
FIG. 7 shows a vehicle having an engine including a turbocharger system.

FIG. 7 shows another example of the vehicle 50. The vehicle 50 shown in FIG. 7 includes many similar components to the vehicle shown in FIGS. 1 and 2. Therefore, similar parts are labeled accordingly.

The turbocharger system 54 is shown in FIG. 7. The turbocharger system 54 additionally includes a solenoid valve 700. The solenoid valve 700 may be air-cooled to reduce the temperature of the solenoid and improve operation of the valve. In the depicted example, the solenoid valve 700 is coupled to the intake conduit 64. In this way, the solenoid valve 700 receives cooling airflow from the intake conduit 64 which is positioned upstream of the compressor 58. In other examples, the solenoid valve 700 may be coupled to a branch conduit, such as the branch conduit 74 shown in FIG. 1. It will be appreciated that branch conduit 74 branches from intake conduit 64.

Continuing with FIG. 7, the solenoid valve 700 is coupled to the wastegate actuator 116. Specifically, the solenoid valve 700 is configured to adjust a position of a wastegate actuator 116 and specifically control pneumatics in the wastegate actuator. Arrow 702 denotes the coupling between the wastegate actuator 116 and the solenoid valve 700. As shown, the wastegate actuator 116 is pneumatically coupled to intake conduit 84 via pneumatic line 120. In this way, air flow through the intake system may be used to control the wastegate actuator 116. The wastegate actuator 116 is therefore in the depicted example a pneumatic wastegate actuator. However, other types of wastegate actuators have been contemplated. The wastegate actuator 116 may be coupled to a pressure or vacuum source. Specifically in one example, the pressure acting on the pneumatic wastegate actuator (and thus, the actuator's stroke) may be regulated by a solenoid valve. The solenoid valve itself may be operated or regulated by a controller such as a powertrain control module (PCM), via pulse width modulation (PWM) power, in one example. Additionally, the solenoid valve may be placed serially in line in a hose from the pressure source to actuator. Furthermore, the solenoid valve may be a 3-way valve. The 3-way valve may include, a pressure source is input and an input may be connected to either the pneumatic actuator, or to a dump passage, which returns to low pressure at compressor inlet, in some examples. The PWM-controlled solenoid valve may dither between the two positions by spending more or less time in either position, the pressure fed to the pneumatic actuator may vary from zero to full inlet pressure. However, in other examples an electric wastegate actuator may be utilized which may not be coupled to a pressure source and/or include a solenoid valve.

Figure 8:
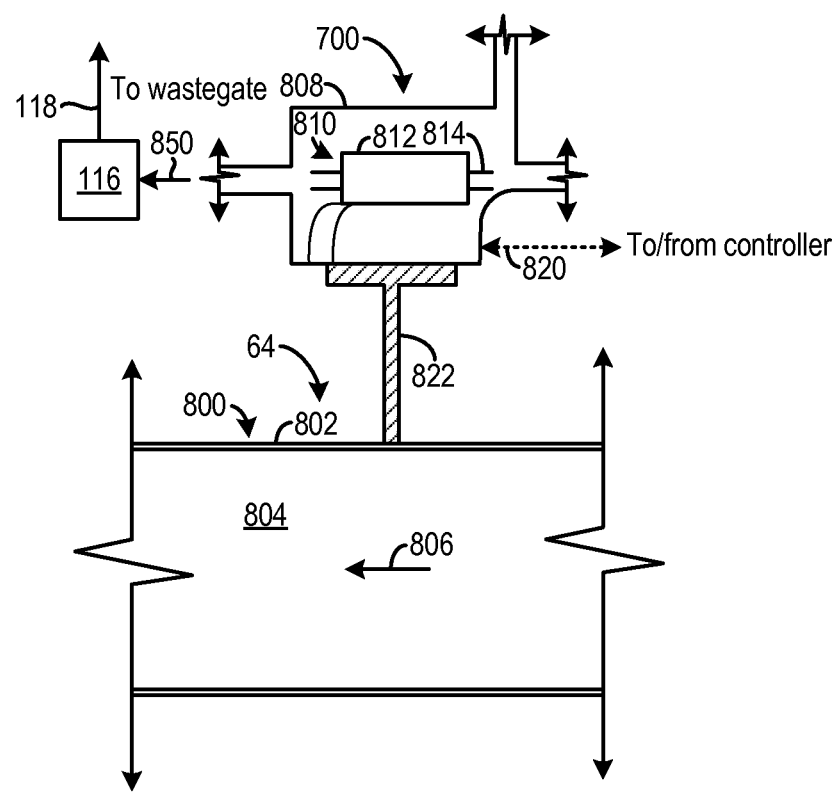
FIG. 8 shows a detailed view of the solenoid valve included in the turbocharger system shown in FIG. 7.

FIG. 8 shows a detailed view of the solenoid valve 700, intake conduit 64, and wastegate actuator 116. The solenoid valve 700 is spaced away from the wastegate actuator 116. However in other examples, the solenoid valve and the wastegate actuator may be integrated into a single unit. Additionally, the solenoid valve may be coupled to the wastegate actuator via an air hose. The intake conduit 64 includes a housing 800 having an exterior surface 802. The intake conduit 64 also includes an interior section 804 through which intake air flow, denoted via arrow 806. The solenoid valve 700 is configured to initiate actuation of the wastegate actuator 116, denoted via arrow 850. As previously discussed, the wastegate actuator 116 is coupled to the wastegate 114, shown in FIG. 7, denoted via line 118. Further in some example, the wastegate actuator 116 may be air-cooled, via the techniques shown in FIGS. 1-5, and therefore receive cooling air from an intake conduit.

The solenoid valve 700 includes a solenoid valve housing 808. As shown the housing 808 is spaced away from the intake conduit 64. The solenoid valve housing 808 at least partially encloses interior componentry 810. The interior componentry 810 may include a coil 812 surrounding a core tube 814. The coil 812 is represented via a rectangle. However, it will be appreciated that coil 812 may include a wire having a plurality of turns. The wire may be configured to be selectively energized via the controller 150, shown in FIG. 7. Arrow 820 represents the electronic coupling between the controller 150, shown in FIG. 7, and the solenoid valve 700.

A heat sink tab 822 included in the solenoid valve 700 is coupled to the intake conduit 64. Specifically in the depicted example, the heat sink tab 822 is in face sharing contact with the solenoid valve housing 808 and the external surface 802 of the intake conduit 64. However, other suitable coupling techniques have been contemplated. The heat sink tab 822 may take a variety of forms. In one example, the solenoid coil may be wrapped around a hollow spool and the regulated air source may pass through the center. In such an example, the heat sink tab may be external to the solenoid body in order to extend into the intake air flow. Additionally, the heat sink tab may also be in close contact with the coil. Further still in one example, the spool may be metallic for increased conduction. The spool may have end flanges to contain the coil winding and the flanges may be extended as tabs for external cooling. Additionally, the spool may be surrounded by a metallic piece essentially cylindrical in form. A cooling tab may extend from this cylinder. In some examples, the heat sink tab 822 may provide the only cooling to the solenoid valve 700.

However, in other examples additional cooling systems, components, etc., may be used to provide cooling to the solenoid valve.

It will be appreciated that when the heat sink tab 822 is included in the solenoid valve 700 heat is transferred from the solenoid valve to the intake conduit 64, thereby reducing the temperature of the solenoid valve, improving operation of the solenoid valve, and decreasing the likelihood of over-temperature conditions in the solenoid valve. As a result, the longevity of the solenoid valve is increased. Further in some examples, an intake conduit may be routed through the housing 808 of the solenoid valve 700 to provide cooling to the solenoid valve. The intake conduit may branch off of the intake conduit 64.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger system, comprising:
a turbine bypass conduit in fluidic communication with a turbine inlet and a turbine outlet;
a wastegate actuator coupled to a wastegate in the turbine bypass conduit adjusting a wastegate position; and
an air-cooled solenoid valve coupled to the wastegate actuator adjusting a position of the wastegate actuator and air-cooled via airflow traveling through an intake conduit and to a compressor mechanically coupled to a turbine.

2. The turbocharger system of claim 1, where the air-cooled solenoid valve is coupled to an exterior surface of the intake conduit, the airflow traveling along an interior surface of the intake conduit.

3. The turbocharger system of claim 1, where the wastegate actuator is a pneumatically controlled wastegate actuator.

4. The turbocharger system of claim 3, where the wastegate actuator is coupled to the intake conduit downstream of the compressor via a pneumatic line.

5. The turbocharger system of claim 1, where the air-cooled solenoid valve includes a heat sink tab coupled to a solenoid valve housing and the intake conduit.

6. The turbocharger system of claim 5, where the solenoid valve housing is spaced away from the intake conduit.

7. The turbocharger system of claim 1, where the solenoid valve is a 3-way solenoid valve.

8. The turbocharger system of claim 1, where the wastegate actuator is air-cooled and receives cooling airflow from the intake conduit.

9. The turbocharger system of claim 1, where the wastegate actuator is spaced away from the solenoid valve.

10. The turbocharger system of claim 1, further comprising a charge air cooler positioned downstream of the compressor, the airflow cooling the air-cooled solenoid valve cooled via the charge air cooler.

11. The turbocharger system of claim 1, where the wastegate adjusts exhaust gas flow through the turbine bypass conduit.

12. The turbocharger system of claim 1, where the intake conduit is a branch conduit branching from an intake conduit directly coupled to the compressor, the branch conduit in parallel fluidic communication with the intake conduit and having an inlet opening to the intake conduit at an upstream location and an outlet opening to the intake conduit at a downstream location.

13. A turbocharger system comprising:
a turbine positioned downstream of a combustion chamber;
a turbine bypass conduit in fluidic communication upstream and downstream of the turbine;
a wastegate positioned in the turbine bypass conduit;
a pneumatic wastegate actuator adjusting position of the wastegate and coupled to the wastegate; and
an air-cooled solenoid valve coupled to an intake conduit directly upstream of a compressor mechanically coupled to the turbine adjustinq a position of the wastegate actuator, the solenoid valve air-cooled via intake air flow traveling to the compressor.

14. The turbocharger system of claim 13, where the pneumatic wastegate actuator is spaced away from the air-cooled solenoid valve.

15. The turbocharger system of claim 13, where the pneumatic wastegate actuator receives boosted air from a second intake conduit positioned downstream of the compressor.

16. The turbocharger system of claim 13, where the air-cooled solenoid valve includes a heat sink tab in face sharing contact with a solenoid valve housing and face sharing contact with an exterior surface of the intake conduit, the heat sink tab transferring heat from the solenoid valve to the intake conduit.

17. A turbocharger system comprising:
a turbine positioned downstream of a combustion chamber;
a turbine bypass conduit in fluidic communication upstream and downstream of the turbine;
a wastegate positioned in the turbine bypass conduit;
an air-cooled pneumatic wastegate actuator adjusting position of the wastegate and coupled to the wastegate, the air-cooled pneumatic wastegate actuator receiving cooling airflow from an intake conduit positioned upstream of a compressor mechanically coupled to the turbine, the cooling airflow returning to the intake conduit after cooling the air-cooled pneumatic wastegate actuator; and an air-cooled solenoid valve coupled to the intake conduit.

18. The turbocharger system of claim 17, where the solenoid valve includes a heat sink tab coupled to a solenoid valve housing and in face sharing contact with an exterior surface of the intake conduit.

19. The turbocharger system of claim 17, where the solenoid valve is spaced away from the air-cooled pneumatic wastegate actuator.

20. The turbocharger system of claim 17, where the wastegate is spaced away from the air-cooled solenoid valve.

* * * * *